US009297421B2

(12) United States Patent
Armstrong

(10) Patent No.: US 9,297,421 B2
(45) Date of Patent: Mar. 29, 2016

(54) PISTON ASSEMBLY TRANSPORTATION AND INSTALLATION APPARATUS AND METHODS OF TRANSPORTING AND INSTALLING A PISTON ASSEMBLY THEREWITH

(71) Applicant: Federal-Mogul Corporation, Southfield, MI (US)

(72) Inventor: Kim Armstrong, Rochester Hills, MI (US)

(73) Assignee: Federal-Mogul Corporation, Southfield, MI (US)

( * ) Notice: Subject to any disclaimer, the term of this patent is extended or adjusted under 35 U.S.C. 154(b) by 154 days.

(21) Appl. No.: 14/164,535

(22) Filed: Jan. 27, 2014

(65) Prior Publication Data

US 2014/0137387 A1 May 22, 2014

Related U.S. Application Data

(62) Division of application No. 12/849,097, filed on Aug. 3, 2010, now Pat. No. 8,640,314.

(51) Int. Cl.
*B23P 19/04* (2006.01)
*F16C 35/067* (2006.01)
(Continued)

(52) U.S. Cl.
CPC .............. *F16C 35/067* (2013.01); *B23P 19/043* (2013.01); *B25B 27/12* (2013.01); *F16J 9/10* (2013.01); *Y10T 29/49826* (2015.01); *Y10T 29/536* (2015.01)

(58) Field of Classification Search
CPC .......... F16C 35/067; F16J 9/10; B25B 27/12; B23P 19/043; Y10T 29/536; Y10T 29/49826
See application file for complete search history.

(56) References Cited

U.S. PATENT DOCUMENTS

| 1,572,801 | A | * | 2/1926 | Kearney | ................. B25B 27/12 29/222 |
| 1,593,220 | A | * | 7/1926 | Phelps | .................... B25B 27/12 29/222 |
| 2,697,870 | A | * | 12/1954 | Zucker | .................... B25B 27/12 29/222 |

(Continued)

FOREIGN PATENT DOCUMENTS

| DE | 125537 C | 4/1928 |
| DE | 19912166 A1 | 9/2000 |

(Continued)

*Primary Examiner* — Richard Chang
(74) *Attorney, Agent, or Firm* — Robert L. Stearns; Dickinson Wright, PLLC

(57) ABSTRACT

A piston assembly transportation and assembly apparatus and methods of transporting and installing a piston assembly therewith are provided. The apparatus maintains a piston assembly in its assembled state during transportation without allowing damage and contamination to the piston assembly. The apparatus also facilitates storage and installation of the piston assembly into a cylinder bore. The apparatus includes a housing having a bore bounded by an inner cylindrical surface extending from a first end of the housing toward a second end of the housing. A chamfered surface diverges radially outwardly from the first end to mate with an upper surface of a stuffing cone during assembly. The second end has a wall extending radially inwardly from the inner cylindrical surface to axially confront an upper crown of the piston assembly to both prevent the piston assembly from passing though the apparatus and to prevent contamination from entering the apparatus.

5 Claims, 3 Drawing Sheets

(51) Int. Cl.
*B25B 27/12* (2006.01)
*F16J 9/10* (2006.01)

(56) References Cited

U.S. PATENT DOCUMENTS

| | | | |
|---|---|---|---|
| 3,561,091 A * | 2/1971 | Pigozzi | B25B 27/12 29/222 |
| 3,707,027 A * | 12/1972 | Davis | B25B 27/12 29/222 |
| 3,754,312 A | 8/1973 | Komorek | |
| 4,449,552 A | 5/1984 | Porel | |
| 4,480,368 A | 11/1984 | Vachon | |
| 4,594,760 A | 6/1986 | Dillard | |
| 4,971,846 A | 11/1990 | Lundy | |
| 6,318,551 B1 | 11/2001 | Calvert et al. | |
| 6,389,667 B1 | 5/2002 | Cook et al. | |
| 6,516,511 B1 | 2/2003 | Cook et al. | |
| 6,634,386 B1 | 10/2003 | Maloney et al. | |
| 6,779,660 B1 | 8/2004 | Calvert et al. | |
| 6,810,915 B2 | 11/2004 | Umetsu et al. | |

FOREIGN PATENT DOCUMENTS

| | | |
|---|---|---|
| JP | 59115129 A | 7/1984 |
| JP | H01166743 U | 11/1989 |
| JP | H0625659 U | 4/1994 |
| WO | 8403082 A1 | 8/1984 |

* cited by examiner

PISTON ASSEMBLY TRANSPORTATION AND INSTALLATION APPARATUS AND METHODS OF TRANSPORTING AND INSTALLING A PISTON ASSEMBLY THEREWITH

This divisional application claims priority to U.S. application Ser. No. 12/849,097, filed Aug. 3, 2010, and is incorporated herein by reference.

BACKGROUND OF THE INVENTION

1. Technical Field

This invention relates generally to internal combustion engine pistons, and more particularly to apparatus for transporting and installing piston assemblies.

2. Related Art

The transportation of a piston assembly, including a piston head with one or more piston rings and a connecting rod, comes with known problems. For example, maintaining the ring or rings within their respective grooves during transportation can be problematic, thereby resulting in lost or damaged piston rings. Thus, in an effort to prevent losing or damaging piston rings and their associated ring grooves, the piston rings can be maintained radially compressed in the ring grooves. However, a known problem of over compressing the piston rings results if the radial compression is too great. If the piston rings are overly compressed in the ring grooves, the "free gap" desired and provided between ends of the piston ring is plastically reduced, which in turn detracts from the ability of the piston ring to provide the desired expanded radial compression against a cylinder wall in use. As such, the sealing and scraping function of the piston ring is diminished.

Further, assembling the piston assembly into a cylinder bore of an engine block is a complex process requiring the piston rings to be at least slightly compressed radially for receipt in the cylinder bore. It is known to use a compression sleeve, also referred to as stuffing cone or ring, during assembly that gradually causes the piston rings to be compressed radially inwardly along a constant tapered surface sufficiently for receipt within the cylinder bore of the engine block. Although the compression sleeve functions well to aid in assembly, the aforementioned problems remain with respect to transporting and storing piston assemblies prior to installation into an engine.

SUMMARY OF THE INVENTION

In accordance with one aspect of the invention, a piston assembly transportation and assembly apparatus configured to maintain a piston assembly in its assembled state during transportation and to aid in the installation of the piston assembly into a cylinder bore is provided. The piston assembly transportation and assembly apparatus includes a housing having a bore bounded by an inner cylindrical surface extending from a first end of the housing toward a second end of the housing. A chamfered surface diverges radially outwardly from the first end toward the second end and the second end has a wall extending radially inwardly from the inner cylindrical surface to axially confront an upper crown of the piston assembly.

In accordance with another aspect of the invention, a piston assembly transportation and assembly apparatus configured to maintain a piston assembly in its assembled state during transportation and to aid in the installation of the piston assembly into a cylinder bore in combination with a stuffing cone is provided. The stuffing cone has a through bore extending between a lower end configured to abut an engine block and an upper end and having a conical surface diverging radially outwardly from the through bore toward the upper end. The piston assembly transportation and assembly apparatus includes a housing having a bore bounded by an inner cylindrical surface extending from a first end of the housing toward a second end of the housing. A chamfered surface diverges radially outwardly from the first end toward the second end and is configured to mate with the conical surface of the stuffing cone. The second end has a wall extending radially inwardly from the inner cylindrical surface to axially confront an upper crown of the piston assembly.

In accordance with another aspect of the invention, a piston assembly transportation and assembly apparatus in combination with a piston assembly is provided. The piston assembly includes a piston head having an upper crown with at least one piston ring groove having a piston ring disposed therein. The piston ring is split to provide a gap between free ends of the piston ring. The piston assembly transportation and assembly apparatus includes a housing having a bore bounded by an inner cylindrical surface extending from a first end of the housing toward a second end of the housing. The cylindrical surface is dimensioned to prevent the gap between the piston ring free ends from being completely closed while the piston assembly is received in the housing. A chamfered surface diverges radially outwardly from the first end toward the second end and the second end has a wall extending radially inwardly from the inner cylindrical surface to axially confront an upper crown of the piston assembly.

In accordance with yet another aspect of the invention, a method of transporting and installing a piston assembly is provided. The method includes providing a piston head having at least one piston ring disposed in a ring groove with the piston ring having a free gap provided between uncompressed opposite ends of the piston ring. Further, providing a housing having a bore bounded by an inner cylindrical surface extending from an upper edge of a first end of the housing toward a second end of the housing having a wall extending radially inwardly from the inner cylindrical surface. Further yet, disposing the piston head in the bore of the housing with the piston head facing the second end of the housing without completely closing the free gap of the piston ring. Then, transporting the piston assembly within the housing. Further, providing a stuffing cone having a through bore extending between a lower end configured to abut an engine block and an upper end. Then, positioning the stuffing cone over a cylinder bore of an engine block. Further yet, bringing the first end of the housing into abutment with the upper end of the stuffing cone. And, pushing the piston assembly from the housing through the stuffing cone and into the cylinder bore.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
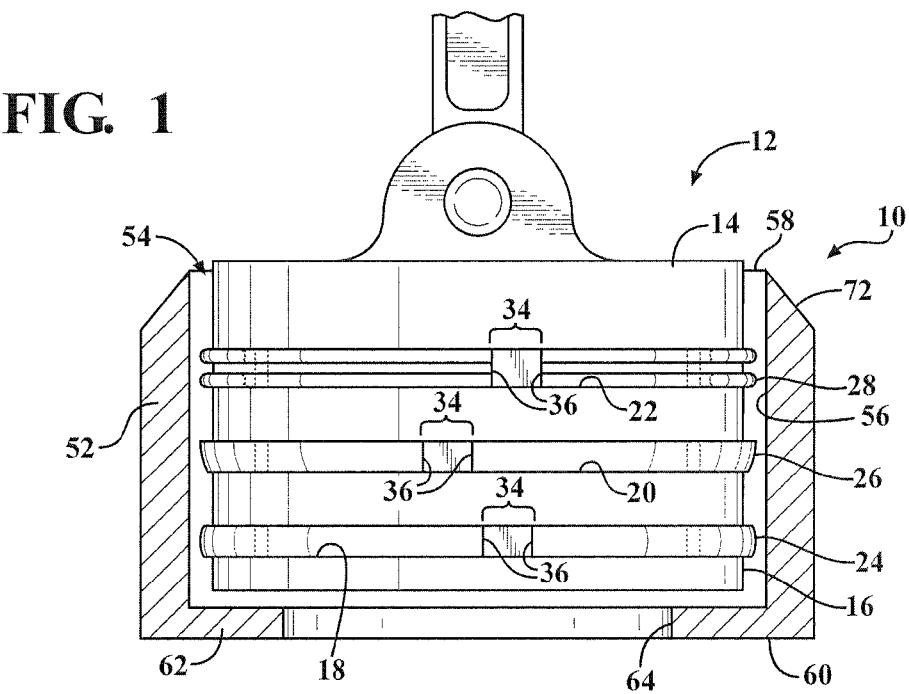
FIG. 1 is a partial cross-sectional elevation view showing a piston assembly received in a transportation and assembly apparatus constructed in accordance with one aspect of the invention with the transportation and assembly apparatus shown in a transportation state.
Figure 2:
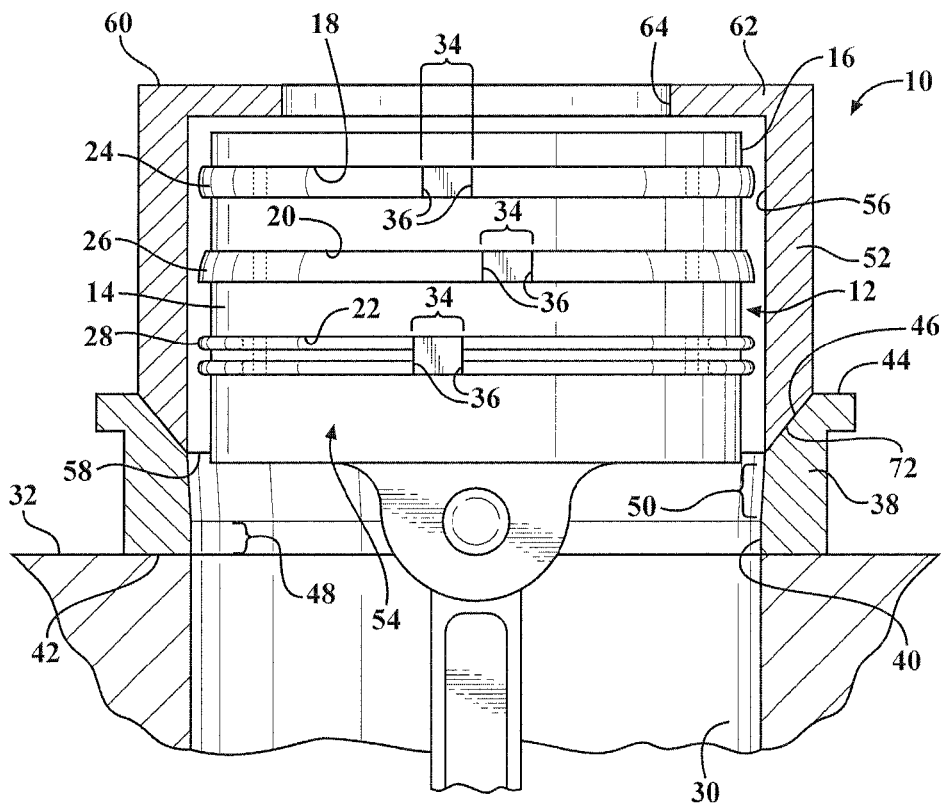
FIG. 2 is an enlarged partial cross-sectional elevation view of the transportation and assembly apparatus and piston assembly shown in an initial state of assembly.
Figure 2A:
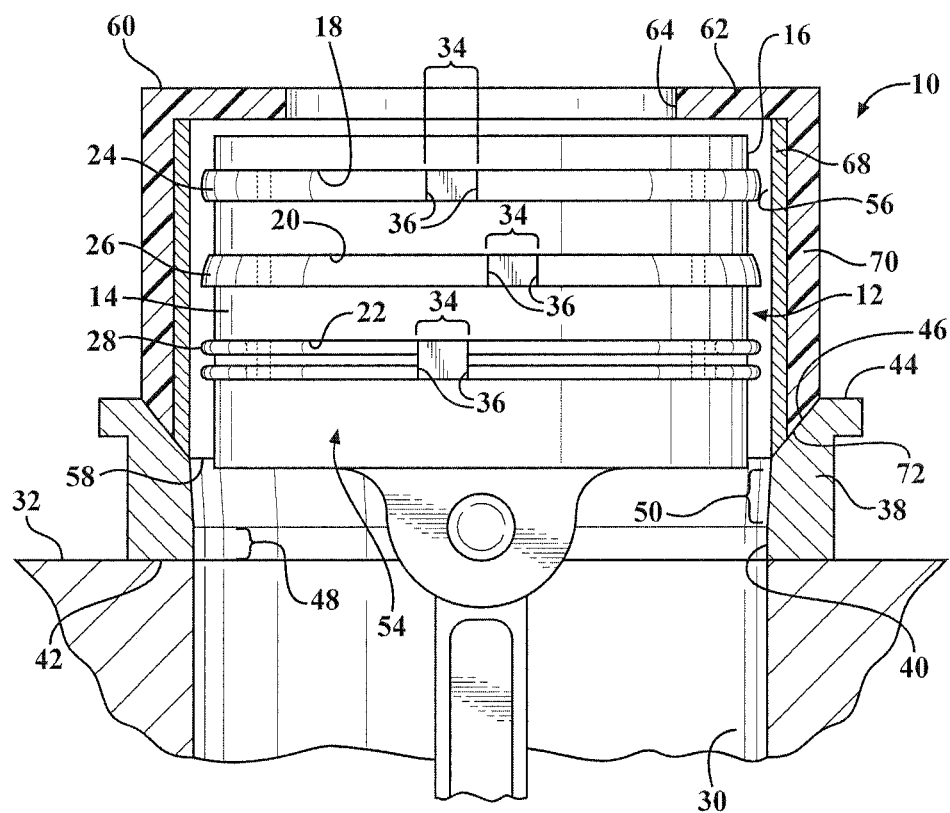
FIG. 2A is a view similar to FIG. 2 of a transportation and assembly apparatus constructed in accordance with another aspect of the invention.
Figure 3:
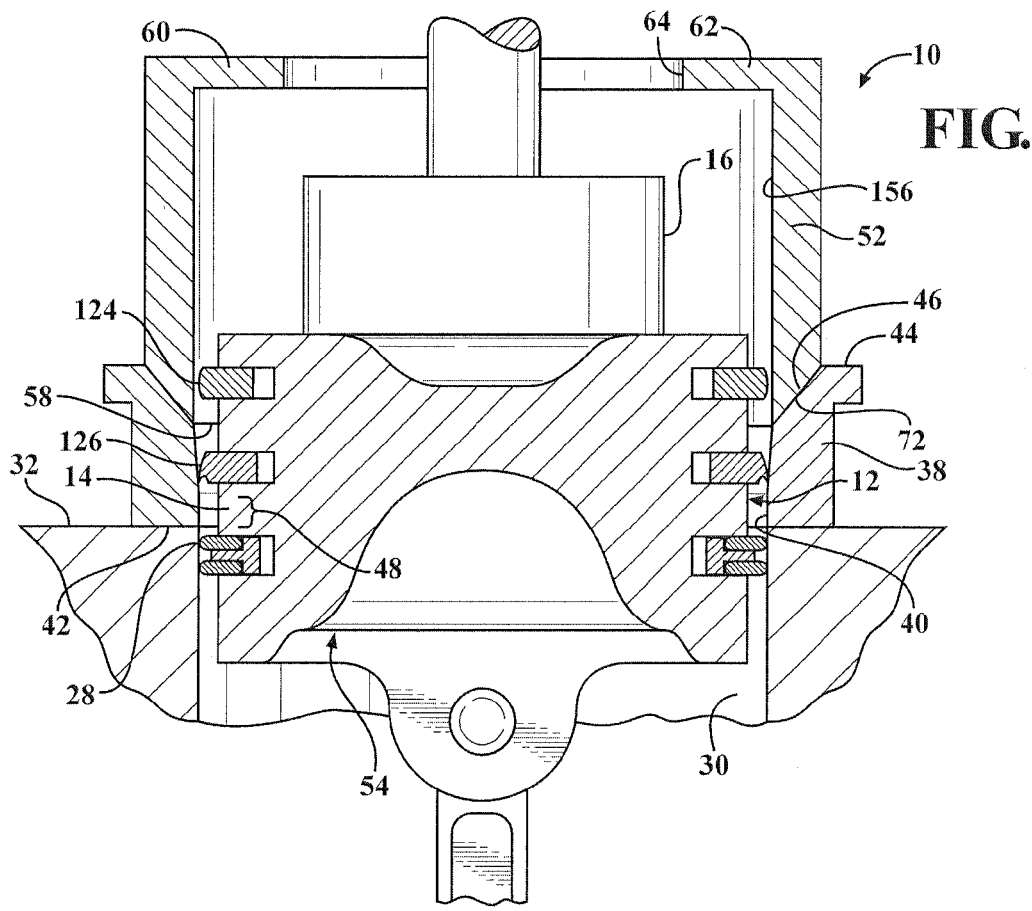
FIG. 3 is a view similar to FIG. 2 showing the piston assembly in an advanced state of assembly.

Referring in more detail to the drawings, FIG. 1 illustrates a piston assembly transportation and assembly apparatus, referred to hereafter as apparatus 10, constructed in accordance with one aspect of the invention. The apparatus 10 provides methods of transporting and installing a piston assembly 12 therewith. The piston assembly 12, having a piston body, also referred to as piston head 14, and an upper crown 16 with at least one piston ring groove, and shown here as a plurality of piston ring grooves 18, 20, 22, with respective piston rings 24, 26, 28 disposed therein, is disposed in the apparatus 10 for storage, transportation, and to facilitate assembly of the piston assembly 12 within a cylinder bore 30 of an engine block 32 (FIGS. 2, 2A and 3). The apparatus 10 provides an easy way in which to store and transport the piston assembly 12 without damaging or otherwise impacting the functionality of the piston rings 24, 26, 28, and also provides an easy way in which to directly assemble the piston assembly 12 from the apparatus 10 into the cylinder bore 30.

While storing and transporting the piston assembly 12, it is important to avoid damaging, contaminating and otherwise impacting the ability of the piston assembly 12 to function as intended within the cylinder bore 30. One particular aspect to avoid is causing damage to the piston rings 24, 26, 28. As shown in FIG. 1, the piston rings 24, 26, 28 each are split, thereby forming a gap 34 between free ends 36 of the piston rings 24, 26, 28. The gaps 34 have a predetermined width extending between the free ends 36 that is intended to be maintained prior to assembly and at least in part thereafter to provide a predetermined amount of radially outwardly acting expansion spring force of the rings 24, 26, 28 against the wall of the cylinder bore 30 during use. This spring force is desired to allow the rings 24, 26, 28 to function as intended, whether functioning primary as a compression ring 24, which seals the compression chamber from any leakage during the combustion process; a wiper ring 26, which further seals the combustion chamber and wipes the wall of the cylinder bore 30 clean of any excess oil; and/or an oil seal ring 28, which also wipes excess oil from the wall of the cylinder bore 30 during reciprocation of the piston head 14. As such, it is important that during storage and transportation of the piston assembly 10 that the gaps 34 be maintained, thereby avoiding unwanted radially contracted plastic deformation of the rings 24, 26, 28.

The apparatus 10 is intended to be used in combination with a standard compression cup, also referred to as a piston ring stuffing cone, and referred to hereafter as cone 38. The cone 38 has an annular through bore 40 extending between a lower end 42 configured to abut a generally flat upper sealing surface of the engine block 32 and an upper end 44. The upper end 44 has a tapered, conical surface 46 diverging radially outwardly from the through bore 40 toward the upper end 44. The through bore 40 has a lower region 48 immediately adjacent the lower end 42 that is sized to be the same or substantially the same diameter or slightly smaller in diameter than the cylinder bore 30 to allow the rings 24, 26, 28 to be guided in an unobstructed manner into the cylinder bore 30. The through bore 40 has an upper region that can be tapered in a slight converging manner from the conical surface 46 toward the lower region 48, thus causing the rings 24, 26, 28 to be slightly circumferentially compressed so as to slide freely into the cylinder bore 30 while retaining their elastic spring force tending to expand an outer surface of the rings 24, 26, 28 into abutment with the wall of the cylinder bore 30.

The apparatus 10 has a housing 52 including a bore 54 bounded by a cylindrical inner surface 56 extending from a first end 58 of the housing 52 toward a second end 60 of the housing 52. The second end 60 has a wall 62 extending radially inwardly from the inner cylindrical surface 56. The wall 62 has a through opening 64 formed therein to facilitate disposing the piston assembly 12 into the cylinder bore 30 during assembly, as discussed further below. The through opening 64 is sized to accommodate a plunger 66 (FIG. 3) during assembly, such that the plunger 66 is free to extend through the opening 64 to push the piston assembly 12 out of the apparatus 10, through the cone 38 and into the cylinder bore 30. Although the wall 62 includes the opening 64, the wall 62 extends sufficiently radially inwardly from the inner surface 56 to overlie an outer peripheral portion of the piston upper crown 16, thereby confronting and preventing the piston assembly 12 from passing through the through opening 64. The housing 52 can be constructed entirely of metal, e.g. stainless steel, plastic, or a combination of metal and plastic, such as shown in FIG. 2A, wherein a tubular metal portion 68, e.g. stainless steel, provides the inner surface 56, and an outer plastic portion 70 forms the wall 62 and the balance of the housing 52.

The apparatus inner surface 56 is diametrically dimensioned to prevent the gaps 34 between the piston ring free ends 36 from being completely closed while the piston assembly 10 is received in the housing 52. In addition, the inner surface 56 is diametrically dimensioned to prevent the rings 24, 26, 28 from being dislodged or otherwise removed from the ring grooves 18, 20, 22 while the piston assembly 10 is received in the housing 52. In one construction of the housing 52, such as shown in FIG. 2, the inner surface 56 provides a slight clearance fit relative to an outer surface of the rings 24, 26, 28, though the clearance does not allow the rings to be displaced sufficiently radially outwardly to be removed from the ring grooves 18, 20, 22. In yet another construction of a housing 152, wherein the same reference numerals offset by a factor of 100 are used to identify like features, an inner surface 156 is dimensioned to have a line-to-line or slight interference fit with the outer surface of the rings 124, 126, 128, though not causing the gaps 134 to be completely closed, thereby avoiding unwanted plastic deformation of the rings 124, 126, 128, as discussed above.

Figure 2B:
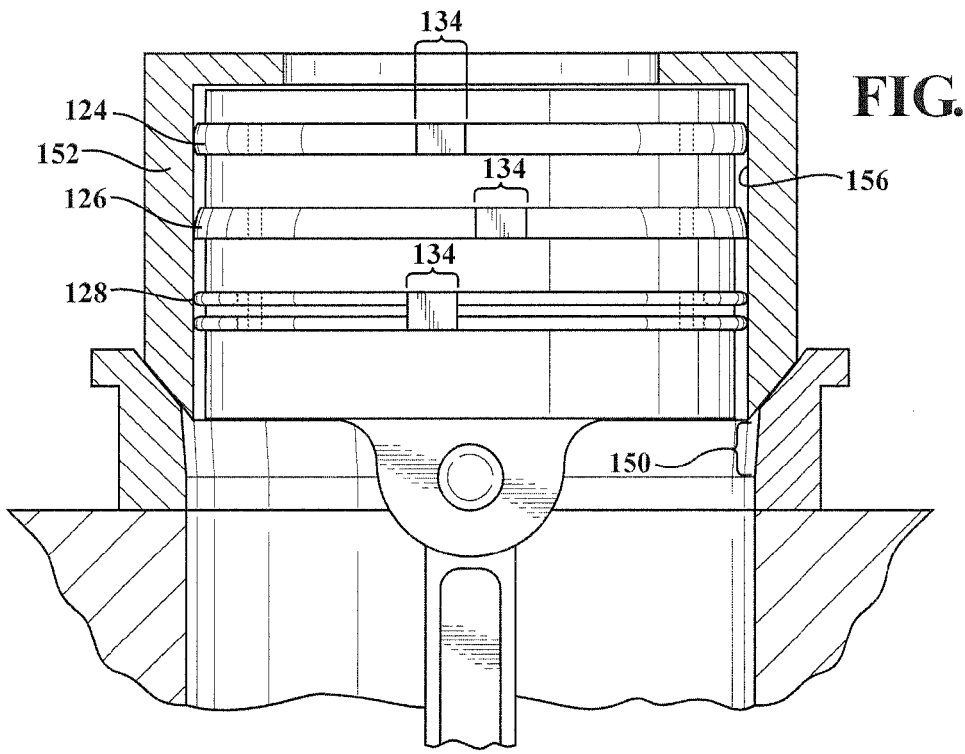
FIG. 2B is a view similar to FIG. 2 of a transportation and assembly apparatus constructed in accordance with another aspect of the invention.

The housing 52 has a chamfered surface 72 diverging radially outwardly from the first end 58 toward the second end 60. The chamfered surface 72 is configured having a conical taper having an angle of inclination configured for flush or substantially flush abutment with the conical surface 46 of the cone 38. Accordingly, upon mating the respective conical surfaces 46, 72 with one another, a substantially continuous wall of material is formed that is substantially free of gaps, wherein the inner surface 56 of the housing 52 is flush or substantially flush with the upper region 50 of the cone through bore 40. It should be recognized that the inner surface 56 is no greater in diameter than the inner surface 46 of the cone 38, and can be slightly reduced in diameter, such as shown with respect to the embodiment of FIG. 2B.

In use, the piston assembly 12 is disposed at least partially in the bore 54 of the housing 52 with the upper crown 16 of the piston head 14 facing the second end 60 of the housing 52 without completely closing the free gaps 34 of the piston rings 24, 26, 28, 124, 126, 128. With the piston assembly 12 disposed in the bore 54, the housing 52, in addition to protecting the piston assembly 12 from being damaged, acts to protect against the ingress of debris/contamination into the bore 54. This is facilitated by the wall 62 overlying the piston head 14, thereby closing off any potential path to the ingress of debris/contamination. The piston assembly 12 can now be stored and transported as desired for subsequent assembly, such as in a position shown in FIG. 1.

During assembly, the stuffing cone 38 is positioned over the cylinder bore 30 in concentric relation therewith, such the lower region 48 of the cone 38 is flush or substantially flush with the cylinder bore 30.

Then, the first end 58 of the housing 52 is brought into nested, conforming abutment with the upper end 44 of the stuffing cone 38, such that the respective conical surfaces 46, 72 nest with one another to align the bore 54 of the housing 52 axially relative to the bore 40 of the cone 38.

Further, the plunger 66 is then used to push the piston assembly 12 axially outwardly from the housing 52 through the stuffing cone 38 and into the cylinder bore 30. As the piston assembly 12 is urged into the cylinder bore 30, as shown in FIG. 3, the respective piston rings 24, 26, 28, 124, 126, 128 are caused to compress radially inwardly by the cone 38 sufficiently to allow them to slide freely into the cylinder bore 30. Given the rings 24, 26, 28, 124, 126, 128 have remained in a relaxed or substantially relaxed and unbiased state prior to assembly, the piston rings 24, 26, 28, 124, 126, 128 retain their ability to function as intended within the cylinder bore 30.

Upon completing the assembly process, the housing 52 can reused as desired. Accordingly, not only is the housing 52 well suited to store and transport piston assemblies, but it is also economical in use.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of transporting and installing a piston assembly, comprising:
   providing a piston head having at least one piston ring disposed in a ring groove with the piston ring having a free gap provided between uncompressed opposite ends of the piston ring;
   providing a housing having a bore bounded by an inner cylindrical surface extending from an upper edge of a first end of the housing toward a second end of the housing having a wall extending radially inwardly from the inner cylindrical surface;
   disposing the piston head in the bore of the housing with the piston head facing the second end of the housing without completely closing the free gap of the piston ring;
   transporting the piston assembly within the housing;
   providing a stuffing cone having a through bore extending between a lower end configured to abut an engine block and an upper end;
   positioning the stuffing cone over a cylinder bore of the engine block;
   bringing the first end of the housing into abutment with the upper end of the stuffing cone; and
   pushing the piston assembly from the housing through the stuffing cone and into the cylinder bore.

2. The method of claim 1 further including providing the first end of the housing and upper end of the stuffing ring with tapered surfaces and bringing the tapered surfaces into conforming abutment with one another.

3. The method of claim 1 further including providing a circumferential clearance fit between the piston ring and the inner cylindrical surface of the housing.

4. The method of claim 3 further including extending the piston ring into the ring groove over a circumferentially extending depth that is greater than the circumferential clearance fit to prevent the piston ring from coming out of the ring groove while the piston assembly is in the bore.

5. The method of claim 1 further including reusing the housing for subsequent storage, transportation and installation of a piston assembly into a cylinder bore.

* * * * *